(No Model.) 6 Sheets—Sheet 1.

F. H. RICHARDS.
BUTTON FASTENER SETTING MACHINE.

No. 319,507. Patented June 9, 1885.

Witnesses:
H. W. Faulkner.
H. F. L. Orcutt.

Inventor:
Francis H. Richards.

(No Model.)

F. H. RICHARDS.
BUTTON FASTENER SETTING MACHINE.

No. 319,507. Patented June 9, 1885.

Fig. 3.

Witnesses;
H. W. Faulkner
H. F. L. Orcutt

Inventor;
Francis H. Richards.

(No Model.)
6 Sheets—Sheet 4.

F. H. RICHARDS.
BUTTON FASTENER SETTING MACHINE.

No. 319,507. Patented June 9, 1885.

Witnesses:
H. W. Faulkner
H. F. L. Orcutt

Inventor:
Francis H. Richards.

(No Model.) 6 Sheets—Sheet 6.

F. H. RICHARDS.
BUTTON FASTENER SETTING MACHINE.

No. 319,507. Patented June 9, 1885.

Witnesses:
H. W. Faulkner.
H. F. L. Orcutt.

Inventor;
Francis H. Richards.

UNITED STATES PATENT OFFICE.

FRANCIS H. RICHARDS, OF SPRINGFIELD, MASS., ASSIGNOR TO THE AMERICAN BUTTON FASTENER COMPANY, OF NEW BRITAIN, CONN.

BUTTON-FASTENER-SETTING MACHINE.

SPECIFICATION forming part of Letters Patent No. 319,507, dated June 9, 1885.

Application filed October 6, 1884. (No model.)

*To all whom it may concern:*

Be it known that I, FRANCIS H. RICHARDS, a citizen of the United States, residing at Springfield, county of Hampden, State of Massachusetts, have invented certain new and useful Improvements in Button-Fastener-Setting Machines, of which the following is a specification, reference being had to the accompanying drawings, forming a part of the same, in which—

Similar reference characters refer to similar parts throughout the several views.

This invention relates to machinery for setting or inserting into shoe-uppers that kind of button-fasteners known in the market as "Kempshall's One-Prong Button-Fasteners," which I have illustrated and described in another application, filed September 13, 1884, Serial No. 142,969, to which reference may be had.

The objects of my present invention are to furnish a machine adapted to be driven by steam or other motive power, having a more convenient arrangement for feeding the fasteners to the driver-channel, and provided with an automatic apparatus for feeding the buttons to the proper position beneath the setting-die.

For the attainment of these objects the invention consists in certain devices and combinations of mechanism, which I will first describe in connection with the drawings, and afterward point out in the claims.

In the drawings, A is the frame of the machine, suitably formed to carry the se details thereof. It may be supported by legs $A^2$, as shown. On its under side it has bearings $A^3$ for supporting a cam-shaft, and rising from the upper side there is a rear column, $A^4$, and a front column, $A^5$, for carrying the feeding and setting mechanisms.

E is the setting-die, having preferably a fixed position in the machine, and so formed that it will properly set the prong of button-fasteners when they are driven against it. This die is or may be substantially the same as now used in various well-known instruments for setting other kinds of button-fasteners. Below this die is placed the presser-slide S, which is held in place by cap $A^6$, and adapted to have a vertically-reciprocating motion, being drawn downward by presser-cam C acting on its roller $O^3$, and upward by spring $S^2$, which is, as herein shown, a push-spring. The shoe upper or fabric to which buttons are to be secured is placed on the top of this presser-slide, which at the proper moment is let up by said cam to clamp said upper or fabric against the under side of said die while the fastener is being set. The slide has a slot in its rear side for receiving the driver, which slot is contracted at its upper end to form driver-channel $D^2$, which channel is, at its upper end, a vertical mortise through the wider top portion of said slide.

Figure 3:
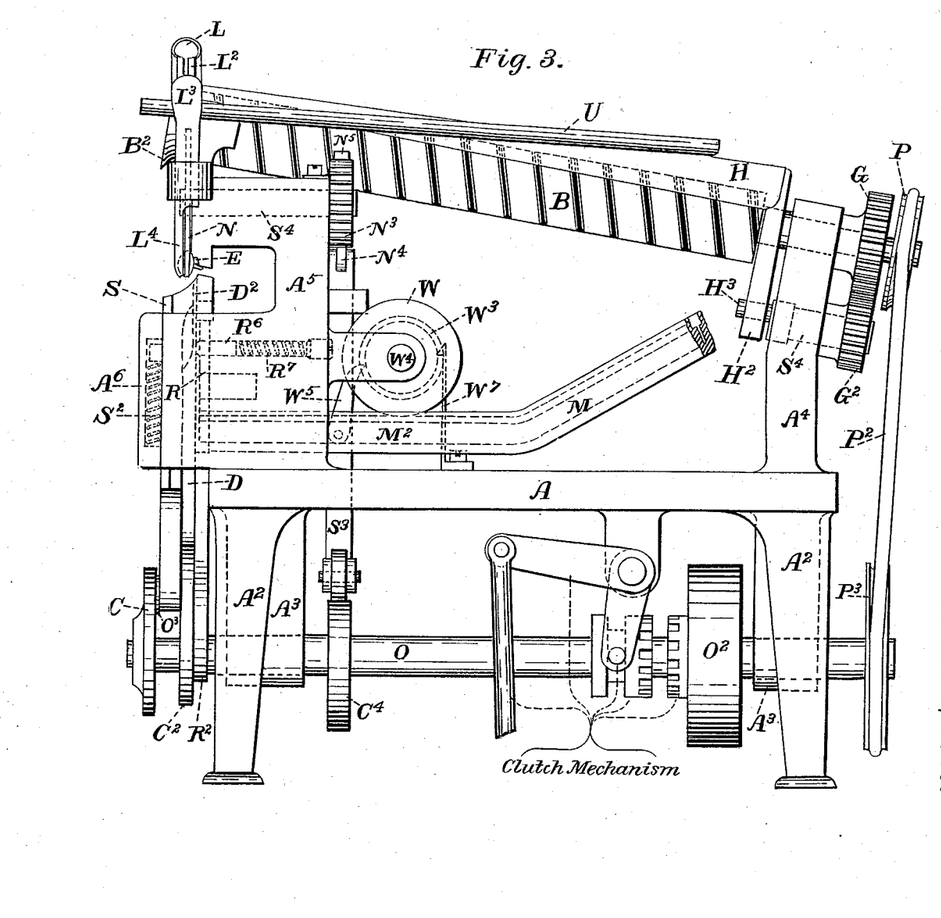
Fig. 3 is an elevation of the side at the right hand in Fig. 2.
Figures 4, 5, 6:
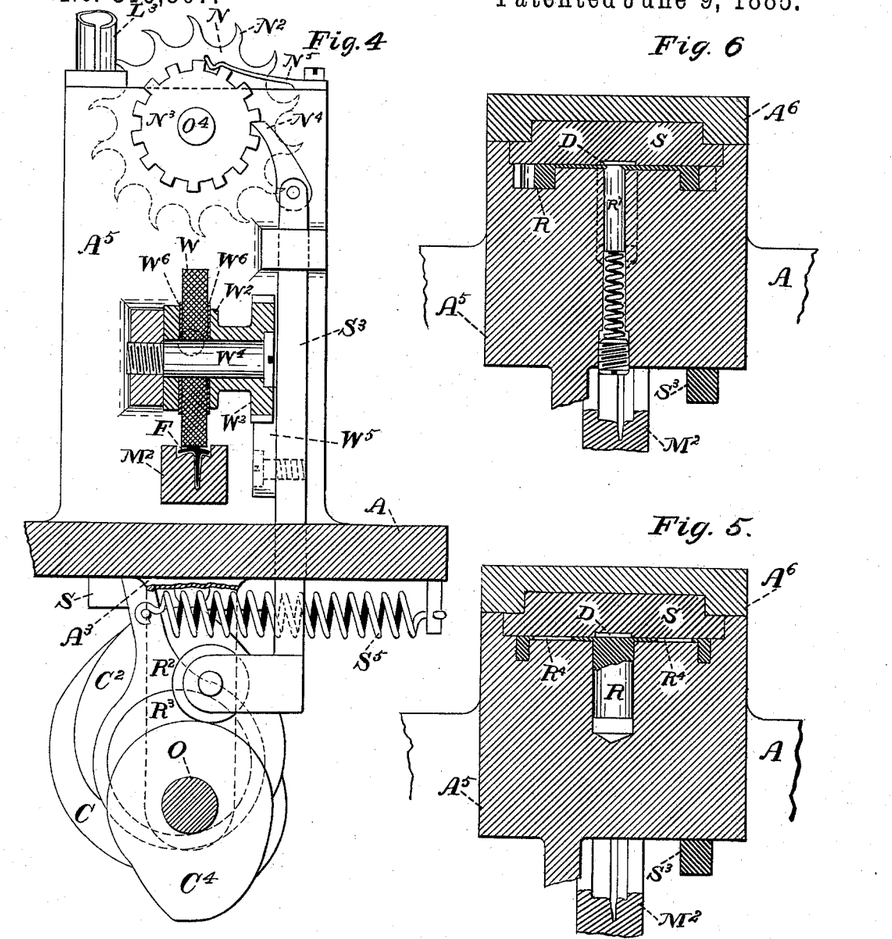
Fig. 4 is a rear vertical sectional elevation of the front part of the machine.
Fig. 5 is a horizontal section of the part shown in Fig. 4 through the center of the fastener-carrier wheel.
Fig. 6 is a similar sectional view through said wheel and the spring-bolt.

O is the cam or driving-shaft of the machine. It has a driving-pulley, $O^2$, fitted loosely thereon, and a suitable clutch mechanism for connecting said pulley to and disconnecting it from said shaft. This mechanism may be of the ordinary description, as shown in Fig. 3, or of other suitable kind.

Figure 11:
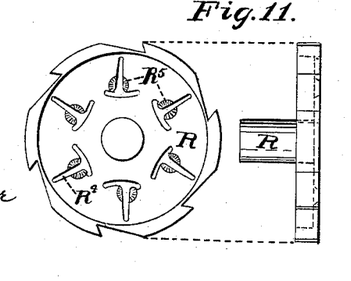
Fig. 11 is a detail drawing showing the carrier-wheel in two views.

D is the driver, formed at its upper end to pass through the driver-channel and adapted to have a vertically-reciprocating motion, the upward stroke being imparted to it by driver-cam $C^2$, and the downward stroke by a spring or cam which is not shown. Immediately back of the presser-slide and driver is placed a carrier-wheel, R, for receiving the fasteners from a magazine, inverting them, and delivering them prong upward to the driver-channel. As shown in the drawings, this wheel is inclosed in a recess formed in the frame, and is intermittently rotated at the proper times by a pawl, $R^2$, which is operated by a suitable cam or eccentric, (as $R^3$ on the driving-shaft O,) and is held in place by spring $S^5$, Fig. 2. Said wheel has a number of openings, $R^4$, each adapted to receive a fastener, and is reduced or countersunk, as at $R^5$, Fig. 11. This is to allow a spring-bolt $R^6$ (held forward by spring $R^7$) to press said fastener from the uppermost hole into the driver-channel above the driver when said driver goes down to the lower limit of its stroke.

The carrier-wheel R is in the nature of a rotary magazine, which, as herein shown, is automatically supplied with button-fasteners at one point from another magazine, as fast as said fasteners are taken out at another point, into the driver-channel. It is not essential to the use of this wheel that any such means as herein described for supplying it with fasteners shall be employed in combination therewith. By dispensing with the feeding devices and providing a suitable opening answering to the present magazine-opening the fasteners may be put into said wheel by hand, and afterward used out as required, substantially the same as cartridges are supplied to and taken from the revolving cylinders of firearms. In this case the size of said wheel may be increased to contain a convenient number of the fasteners.

In machines heretofore used for setting these button-fasteners a supply of the fasteners has been placed in a magazine, through which they have been forced into the driver-channel by a plunger or follower.

When the machines are to be used for manufacturing purposes, it is desirable to save the time required for operating the follower when replenishing the magazine; and, also, to provide means whereby this may be done without interfering, as necessary heretofore, with the continuous operation of the machine. In my present invention, I accomplish these objects by substituting for that follower a feeding device, placed near the delivery end of the magazine, and by so inclining that part of said magazine rearward of said device that the fasteners therein will feed down the magazine-groove by the action of gravity. It is not important what kind of a mechanical movement is used for the aforesaid feeding device, provided only that it shall act upon the fasteners to push them forward as required. The work to be performed by the device is analogous to that of feeding forward cloth in a sewing-machine, and a variety of sewing-machine feed-motions, whether having reciprocating or circular movements, may, with but slight alterations, be adapted to the requirements of my present machine. These feed-motions are, in a variety of forms, so extensively employed in the art of manufacturing shoes that they will be fully understood without a detailed description. Of the variety of such feed-motions in use, I prefer, for my present purposes, an adaptation of that one known as the "circular feed," this being a friction-wheel and a pawl-and-ratchet motion for imparting thereto an intermittent rotary movement. In the drawings, W is such a wheel, arranged to press upon the top of the fasteners, which are in the lower part, $M^2$, of the magazine. Said wheel should have an elastic face to bear against the fasteners, and is preferably made of india-rubber, with a leather covering. This wheel is lightly clamped between collars $W^2$, formed or fixed on the hub of ratchet-wheel $W^3$, which ratchet-wheel is supported by stud $W^4$, and turned by pawl $W^5$, from a slide, $S^3$, operated by a cam, $C^4$, on the cam-shaft. A pawl, $W^7$, is provided for preventing ratchet-wheel $W^3$ from turning backward. The friction-wheel W is preferably furnished with a thin metal washer, $W^6$, on each side thereof, adapted to adhere to said wheel and to slide against collars $W^2$. The construction and adjustment of these parts is preferably such that ratchet-wheel W will be turned somewhat faster than required, so that washers $W^6$ will slip slightly on collars $W^2$ at each movement thereof; but these washers should give sufficient resistance to slightly distort the wheel, and thus insure a constant forward pressure on the fasteners, due to the elasticity of the india-rubber composing said wheel.

The button-feeding apparatus consists of a hopper, preferably inclined, for holding a quantity of buttons, a device for imparting to said hopper a shaking movement, a button-feeding screw for separating the buttons from the mass in the hopper and delivering them one at a time into a suitable channel, an overflow in said channel for regulating the supply of buttons fed to the setting-die, and a positively-acting feeding device for carrying the buttons along said channel to the setting-die.

H is the hopper, having a long slot in its bottom, and B is the button-feed screw, which lies directly beneath said slot. The hopper is formed, preferably, of slightly flexible sheet metal stamped into the required shape, the front end of which is fixed to the frame, the back and end being provided with a swinging frame, $H^2$, having its bearing on the stem of said screw B, and a slot, whereby it is oscillated by crank-pin $H^3$. This produces a kind of torsional vibration of the hopper which is favorable to the proper operation of the screw and slot. The crank-pin is formed on shaft $S^4$, which and the said stem of screw B have their bearing in column $A^4$. Gear G on said stem, meshing with gear $G^2$ on shaft $S^4$, serves to communicate continuous rotary motion from said screw-stem to said crank. The screw itself may be turned by means of a pulley, P, thereon, which is driven by belt $P^2$ from pulley P³ on the driving-shaft O, or by other suitable driving mechanism. I prefer that screw B shall revolve faster than shaft O, because, in practice, the rate at which the buttons are fed varies considerably, so that the maximum rate should be in excess of requirements in order to insure a sufficient average supply.

Figure 12:
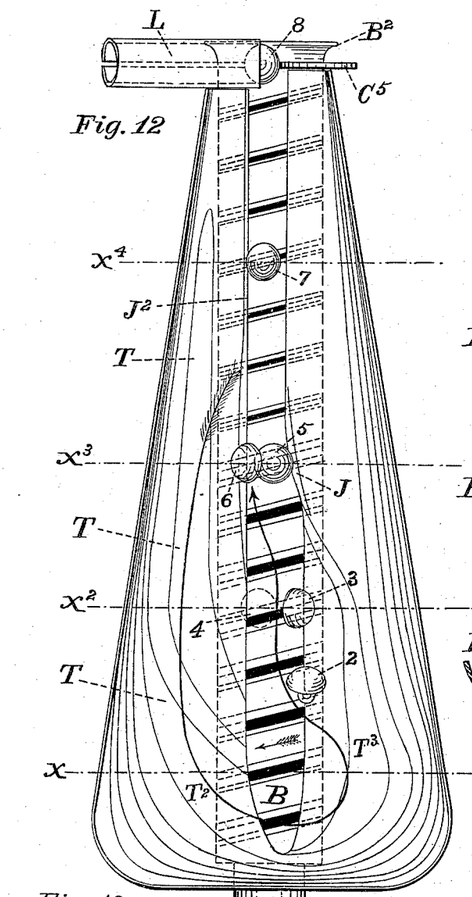
Fig. 12 is a plan view of the hopper.

It should be understood that the hopper may have the bottom thereof made entirely in one plane and still operate with a considerable degree of success; but I have found the efficiency of the button-feeding mechanism to be much increased by constructing said hopper-bottom in a different way. This improved construction is illustrated by Figs. 14, 15, 16, and 17, showing sections of the hopper shown in plan view in Fig. 12. The buttons are placed in suitable quantity in the lower and wider end of the hopper, in which the slot is wider than toward the upper and narrower end, and, being shaken up by the vibration of the hopper, some of them fall against the screw B in about the position shown at 2, against which screw they slide along until their eyes enter the screw-thread, as at 3. Most of the buttons are thus caught by the screw between lines X and X². If only one button is taken by a turn of the thread, it is generally carried over by the screw to the position of 4, and then it slides up along the left-hand elevated edge J² of the slot, reaching, successively, positions 6, 7, and 8, Fig. 12; but if two buttons, as 3 and 4, are caught in the same turn of the thread, as frequently happens, then both pass up together until they reach the cam-shaped edge J of the slot, when one of them, usually 6, is forced out, leaving the other, 5, to be carried on to positions 7 and 8. When any buttons are thus thrown away from the screw, they fall into a trough, T, which is formed along one side of the hopper and terminates at T² on a level with the top of screw B, said trough being separated from said screw by the elevated edge J², as shown best in Figs. 12 and 17. The buttons coming down through this trough pass over the screw into the lower part, T³, of the hopper, from which they are ultimately all taken by the screw, as before. A long curved arrow in Fig. 12 shows the general course of the buttons in the hopper. By making the hopper to have that lower part, T³, a larger part of the screw is covered by the mass of buttons, so that more of these are likely to be caught, as described, in the turns of the thread. Any buttons carried up in improper positions by the screw or by other buttons which are so carried are soon shaken off into trough T, usually before reaching line X⁴. The degree and rapidity of the oscillation of the hopper should, of course, be so graduated as to do this. It is obvious that by properly constructing the hopper therefor the button-feeding screw may be placed in a horizontal position; but as this arrangement is, in my opinion, less reliable and convenient, I prefer to have said screw inclined, as shown.

Figures 1, 19, 20:
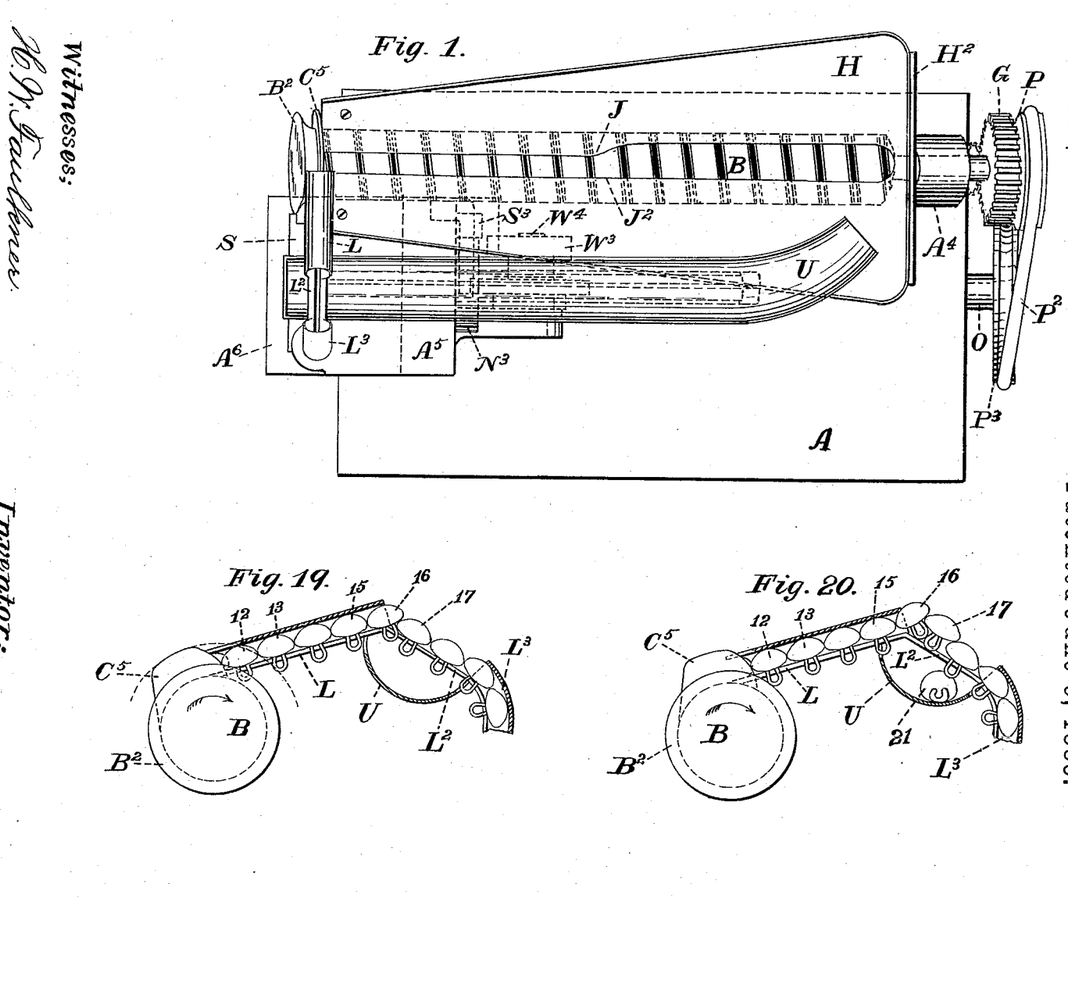
Figure 1 is a plan view of a machine embodying my invention.
Figs. 19 and 20 are views illustrating the operation of the overflow.
Figures 2, 21:
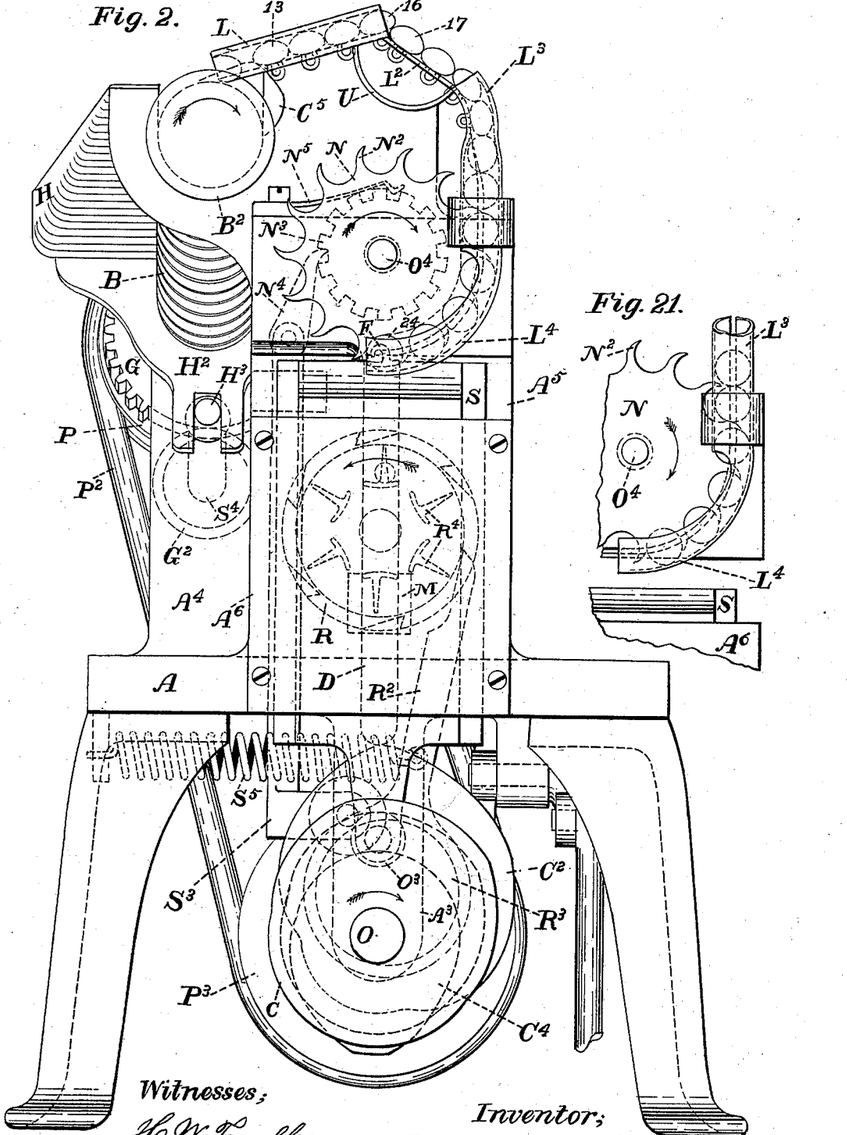
Fig. 2 is a front elevation of the same.
Fig. 21 shows the button-feed wheel in a different position than in Fig. 2.
Figure 18:
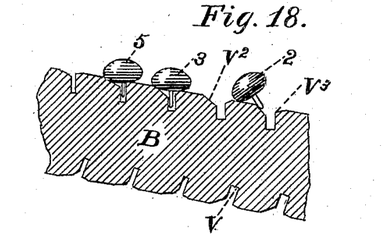
Fig. 18 is a longitudinal section of a part of the button-feeding screw, showing the construction of its thread.

The thread of screw B has a rectangular sectional form, and is preferably made from the lower end as far up as line X³ somewhat wider than actually required, for the purpose of facilitating the entrance thereinto of the button-eyes, and it is preferably made (on the upper side of said screw) vertical to a horizontal plane, as in Fig. 18, being then not at right angles to its axis of rotation. In order to still further increase the efficiency of the screw to catch the button-eyes, the upper edge is beveled about as shown at V², Fig. 18. The effect of this bevel is illustrated in said figure at 2, which represents a button with its eye just entering thread V from the upper side thereof, as they most frequently do. The lower edge of the thread is beveled in a lesser degree, about as shown at V³, for the purpose of increasing the stability of the buttons caught by the screw. On reaching position 8, Fig. 12, the button stands directly in front of channel L, into which it is driven by cam C⁵, which cam is preferably fixed rigidly to the screw. A flange, B², may be formed on the end of the screw to prevent any buttons accidentally passing beyond said channel. Passing through that channel, the buttons first come to a narrow bridge, L², over which they pass into channel L³. This channel extends downward and and terminates in a circular arc, L⁴, at the setting-die, delivering the button to said die in the position shown in Fig. 7. A button-feed wheel, N, having teeth N² engaging the buttons, is arranged concentric to said arc, (which is cut away therefor,) immediately in front of the setting-die, which wheel is fixed to shaft O⁴, whereby it is operated in such manner that after a fastener is set the button held thereby is at once carried away from said die, and another button brought into place ready for the next operation of the machine. The mechanism for turning shaft O⁴ is a simple ratchet-and-pawl motion, which, in the present instance, consists of a ratchet-wheel, N³, fixed to said shaft, and pawl N⁴, connected to slide S³, a holdfast, N⁵, being provided to prevent said ratchet-wheel from being accidentally turned. The teeth N² of wheel N are curved forward at their points, (see Fig. 21,) so as to enter between and separate the buttons and not strike too abruptly against them. Since screw B revolves, as hereinbefore mentioned, faster than shaft O, it is obvious that if each turn of the screw-thread should catch a button, then too many of them would be fed into the channel leading to the setting-die. As this possibility sometimes happens in practice I have provided means for disposing of the surplus, consisting of bridge L² and spout U. In Fig. 2 the bridge and channels L L³ are shown filled with buttons, and it will be obvious that if while wheel N remains at rest another button is fed into channel L, then those on the bridge must be dislodged. This condition is illustrated by Figs. 19 and 20. In the first another button, 12, has been driven into channel L until it touches but does not move button 13. In the next figure button 12 has been driven forward, pushing 15 against 16, and this against 17, partially dislodging both of these, one or both of which fall into the spout at 21, and are returned thereby to the hopper. For the purpose of accelerating the passage of the buttons along the spout one end of this is supported on the hopper and partakes of its shaking motion.

Figure 13:
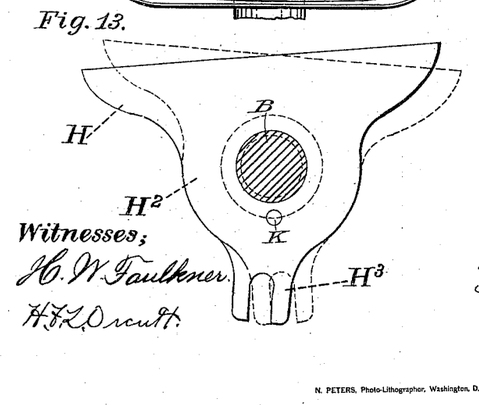
Fig. 13 is a diagram of the rear end of the same.
Figure 14:
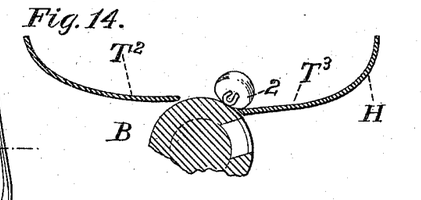
Figs. 14, 15, 16, and 17 are respectively sections of the hopper in lines $x$, $x^2$, $x^3$, and $x^4$ of Fig. 12.
Figure 15:
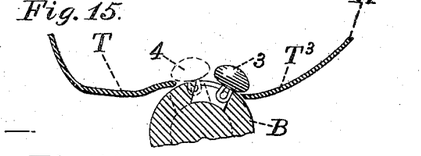
Figure 16:
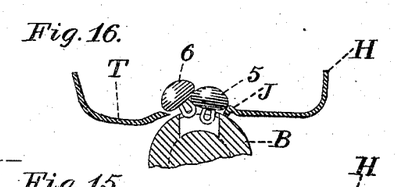
Figure 17:
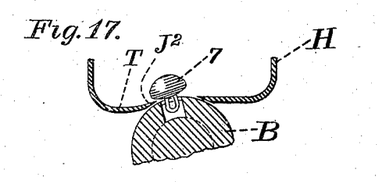

As hereinbefore described, the hopper H is pivotally supported at its rear end upon a reduced portion of the screw B. This method of pivoting the hopper may be improved in some respects, so as to give it a greater lateral movement on the upper side of said screw by pivoting the rear end thereof at a point below said screw, as at K, Fig. 13, the said pivot being in this case a simple pin projecting from the front side of upright $A^4$, Fig. 3, immediately below said screw. In this case the hopper-frame $H^2$ must of course be so formed as to permit a sufficient lateral movement without striking against the screw.

Figures 7, 8, 9, 10:
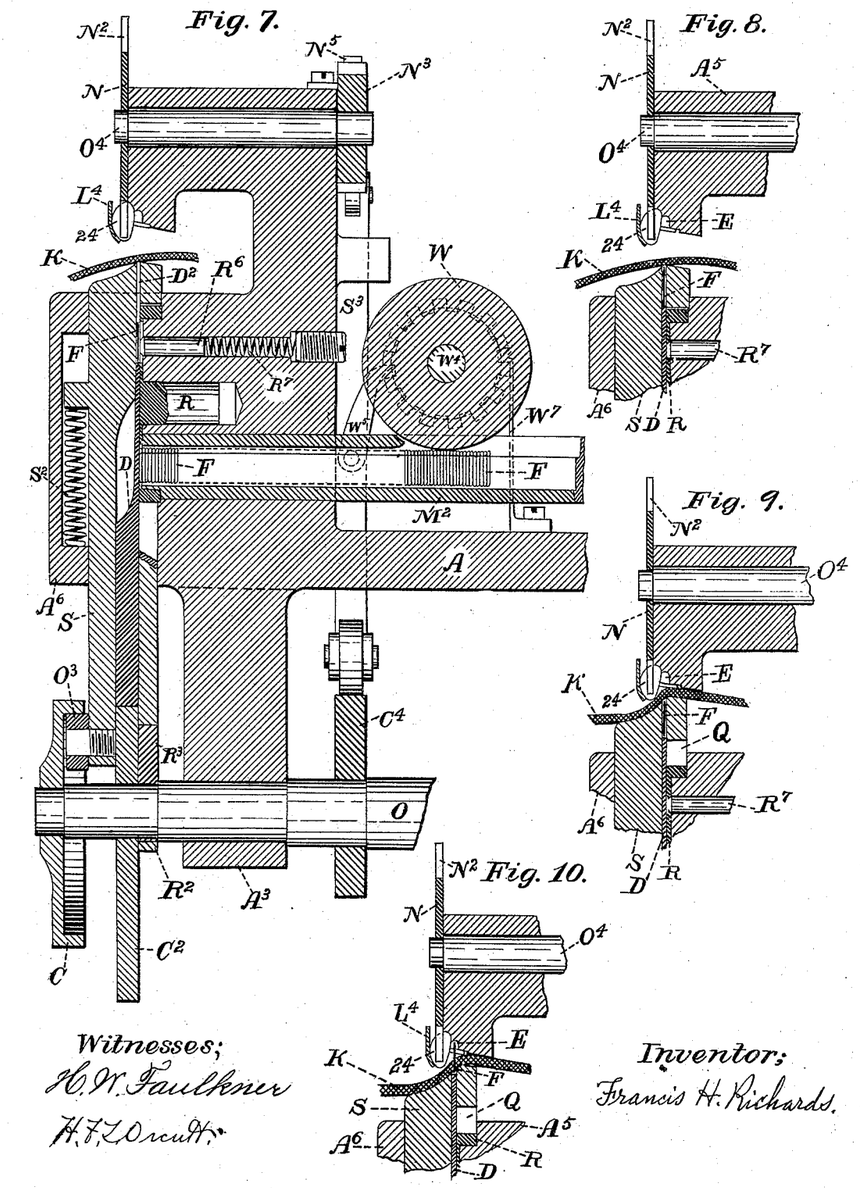
Fig. 7 is a vertical longitudinal section of the part shown in Fig. 4, showing the parts in the positions in which they are when the driver is down.
Figs. 8, 9, and 10 show, respectively, three different positions of parts of Fig. 6.

The operation of this improved machine is as follows: The parts of the machine being at rest in about the position shown in Figs. 1, 2, 3, and 7, the magazine properly supplied with fasteners, and the hopper and channels L $L^3$ with buttons, a shoe upper or fabric, K, to which buttons are to be secured, is then placed in position on presser-slide S, under setting-die E, as shown in Fig. 7. By referring to this figure it will be seen that the wide part of slide S overreaches carrier-wheel R, and while in the above position comes down close to said wheel, so that the fastener F (which is there shown as a short black line in the lower end of driver-channel $D^2$) can then be pushed up into the upper end of said driver-channel without having to pass space Q, Figs. 9 and 10, which is formed by the upward movement of said slide. The driving-shaft O, together with its cams, being now started, the driver is moved up, carrying the fastener into the upper end of the driver-channel, as shown in Fig. 8. Next, the cams move up the driver and slide S together, pressing the shoe-upper against die E, as shown in Fig. 9, and the continuing upward movement of the driver then forces the fastener-prong through said upper, the eye of a button, 24, and against the setting-die, as in Fig. 10. The slide and driver now move downward, wheel N is moved forward one division to carry button 24 out of the button-channel, and all the parts are returned to their original positions ready for a repetition of the entire operation. During the return movement pawl $W^5$ acts to turn wheel W and thus feed forward the supply of fasteners, as hereinbefore mentioned; and during all these operations the button-feeding mechanism is kept in operation, as also hereinbefore described.

It should be understood that if the parts of the machine are so proportioned relative to the length of the prong of the button-fastener that said prong shall be longer than the height of space Q, Figs. 9 and 10, the cams C and $C^2$ may then be so constructed as to first let slide S move clear up, and afterward force the driver D clear up at one stroke, so that the fastener shall pass said space Q, not as hereinbefore described, but by a more simple operation. If, however, the fastener-prongs are shorter than space Q, I consider that the former method of operation is preferable.

It will be understood that the several cams and the other operative parts are to be so proportioned as to properly produce the required motions at the right time, which can be readily accomplished by mechanics skilled in the art of constructing this class of machines.

Having now described my invention, what I claim to be new, and therefore desire to secure by Letters Patent of the United States, is—

1. In a button-fastener-setting machine, in combination, a setting-die having a fixed position therein, a presser-slide adapted to hold fabric against said die, and having a driver-channel, substantially as described, a driver adapted to drive button-fasteners through said channel and fabric and against said die, and a cam-shaft having a cam for operating said presser-slide, and a cam for operating said driver, substantially as set forth.

2. In a button-fastener setting-machine, in combination, a setting-die, a presser-slide adapted to hold fabric against said die, and having a driver-channel, substantially as described, a driver adapted to drive button-fasteners through said channel and fabric against said die, a cam for operating said slide, and a cam for operating said driver, said cams being constructed and arranged to first begin the stroke of the driver, then move up the driver and presser-slide together, and then complete the stroke of the driver, substantially as and for the purpose set forth.

3. In a button-fastener-setting machine, in combination, presser-slide S, having channel $D^2$, driver D, carrier-wheel R, having openings for receiving the fasteners, and pusher $R^6$, substantially as described.

4. In a button-fastener-setting machine, in combination, presser-slide S, having channel $D^2$, driver D, carrier-wheel R, having openings for receiving the fasteners, a magazine, $M^2$, provided with a fastener-feeding device and pusher $R^6$, substantially as described.

5. In combination, magazine M and friction-wheel W, and means, substantially as described, for operating said wheel, whereby fasteners F are fed along the groove of said magazine, substantially as described.

6. In combination, carrier-wheel R, having openings $R^4$ and depressions $R^5$, a pusher adapted to enter said depressions, and means, substantially as described, for operating the carrier-wheel and pusher, substantially as and for the purpose set forth.

7. In a button-fastener-setting machine, in combination, a button-hopper, substantially as described, having a slot in the bottom thereof, and a screw underneath said slot adapted to engage a projecting part of buttons, substantially as set forth.

8. In a button-fastener-setting machine, in combination, a hopper, H, having a slot in the bottom thereof, a revolving screw underneath said slot, and a device, substantially as described, for shaking said hopper, substantially as set forth.

9. In combination, a hopper, as H, which has a slot in the bottom thereof and is rigidly fixed at one end and pivotally supported at the other end, a revolving screw underneath said slot, and a hopper-shaking device, substantially as described, adapted to shake said pivotally-supported end, substantially as set forth.

10. Hopper H, having trough T and elevated edge $J^2$, substantially as and for the purpose described.

11. In a button-fastener-setting machine, in combination, hopper H, having a slot in the bottom thereof consisting of two portions, one wider than the other, said portions being connected by another portion, one side of which is cam-shaped, as at J, Fig. 12, substantially as and for the purpose described.

12. An inclined button-feeding screw having its thread with parallel sides and at less than a right angle to its axis, substantially as and for the purpose described.

13. A button-feeding screw having its thread beveled, as at $V^2$, substantially as and for the purpose described.

14. In combination, screw B, cam $C^5$, and a channel, as L, substantially as described.

15. In combination, screw B, cam $C^5$, channel L, and flange $B^2$ on said screw, substantially as and for the purpose described.

16. In combination, channel L, channel $L^3$, and an intermediate bridge, $L^2$, substantially as and for the purpose described.

17. The combination of hopper H, channel L, bridge $L^2$, leading from said channel L, button-feeding devices, substantially as described, for conveying buttons from said hopper into and through said channel to said bridge, and a spout extending from said bridge into said hopper, substantially as described.

18. In combination, hopper H, button-feeding devices, substantially as described, having an overflow, as $L^2$, and spout U, substantially as and for the purpose described.

19. In combination, a button-channel, as $L^3$, terminating in the curved part $L^4$, toothed wheel N, means, substantially as described, for operating said wheel, and die E, said wheel and said part $L^4$ being so constructed and arranged as to co-operate for the feeding of buttons from said channel to said die, all substantially as set forth.

20. In combination, a channel, as L, having a curved part, as $L^4$, wheel N, having curved teeth $N^2$, and means, substantially as described, for operating said wheel, substantially as specified.

In testimony whereof I have hereunto signed my name this 30th day of September, A. D. 1884.

FRANCIS H. RICHARDS.

Witnesses:
H. W. FAULKNER,
H. F. L. ORCUTT.